US006780364B2

(12) United States Patent
Chiang et al.

(10) Patent No.: US 6,780,364 B2
(45) Date of Patent: Aug. 24, 2004

(54) PROCESS OF MAKING A ROLLER

(75) Inventors: Albert C. Chiang, Mystic, CT (US); John A. Roderick, Scituate, RI (US)

(73) Assignee: Mearthane Products Corporation, Cranston, RI (US)

( * ) Notice: Subject to any disclaimer, the term of this patent is extended or adjusted under 35 U.S.C. 154(b) by 311 days.

(21) Appl. No.: 10/068,140

(22) Filed: Feb. 6, 2002

(65) Prior Publication Data

US 2002/0111259 A1 Aug. 15, 2002

Related U.S. Application Data

(62) Division of application No. 09/256,538, filed on Feb. 24, 1999, now Pat. No. 6,352,771.

(51) Int. Cl.[7] .............................. B29C 45/00; C08J 5/00

(52) U.S. Cl. ................. 264/240; 264/328.3; 264/328.6; 264/331.19

(58) Field of Search ................................ 264/240, 279, 264/328.3, 328.6, 331.19

(56) References Cited

U.S. PATENT DOCUMENTS

| | | | |
|---|---|---|---|
| 3,993,084 | A | 11/1976 | Cullen et al. |
| 4,521,582 | A | 6/1985 | Goyert et al. |
| 5,062,385 | A | 11/1991 | Nishio et al. |
| 5,076,201 | A | 12/1991 | Nishio et al. |
| 5,162,119 | A | 11/1992 | Pappas et al. |
| 5,214,239 | A | 5/1993 | Koga et al. |
| 5,241,343 | A | 8/1993 | Nishio |
| 5,248,560 | A | 9/1993 | Baker et al. |
| 5,311,264 | A | 5/1994 | Kinoshita |
| 5,324,885 | A | 6/1994 | Koga et al. |
| 5,367,367 | A | 11/1994 | Ikeda et al. |
| 5,415,612 | A | 5/1995 | Cralson et al. |
| 5,600,417 | A | 2/1997 | Iguchi et al. |
| 5,602,631 | A | 2/1997 | Sakaguchi |
| 5,655,197 | A | 8/1997 | Okada et al. |
| 5,669,047 | A | 9/1997 | Okuda et al. |
| 5,707,743 | A | 1/1998 | Janes et al. |
| 5,722,022 | A | 2/1998 | Park |
| 5,727,022 | A | 3/1998 | Schäfer et al. |
| 5,732,320 | A | 3/1998 | Domagall et al. |
| 5,752,146 | A | 5/1998 | Sato |
| 5,768,668 | A | 6/1998 | Shiraki et al. |
| 5,804,114 | A | 9/1998 | Janes et al. |
| 5,855,818 | A | 1/1999 | Gan et al. |
| 5,874,172 | A | 2/1999 | Beach et al. |
| 6,042,946 | A | 3/2000 | Massie, II et al. |
| 6,117,557 | A | 9/2000 | Massie, II et al. |

FOREIGN PATENT DOCUMENTS

JP 63189876 A * 8/1988 ................. 399/119

* cited by examiner

*Primary Examiner*—Leo B. Tentoni
(74) *Attorney, Agent, or Firm*—Fish & Richardson P.C.

(57) ABSTRACT

A conductive roller for use in a laser printer includes a solid, thermoset urethane comprising a metal salt and having a hardness of between 30 Shore A and 50 Shore A on cube and a volume resistivity of 1E6 ohm-cm and 9E8 ohm-cm.

6 Claims, 1 Drawing Sheet

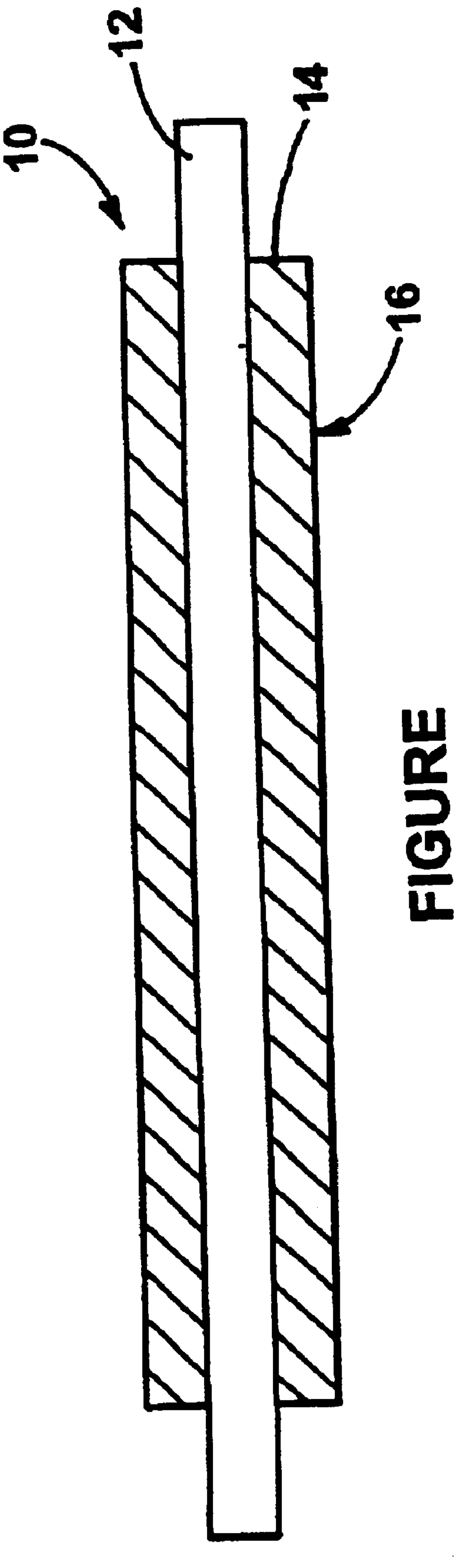
FIGURE

PROCESS OF MAKING A ROLLER

This application is a divisional of U.S. application Ser. No. 09/256,538, filed Feb. 24, 1999. now U.S. Pat. No. 6,352,771.

BACKGROUND OF THE INVENTION

The invention relates to rollers, such as developer or charge rollers, used in laser printers.

A laser printer often includes a digital light emitter photoconductor drum, a charge roller, a developer roller, a developer blade, a transfer roller, and a toner storage unit. During printing, the transfer roller supplies toner to the developer roller, and the developer blade forms the toner into a thin, even layer on the surface of the developer roller. The charge roller charges the photoconductive drum with a positive or negative charge. After the photoconductive drum has been exposed a light emitter, the surface of the photoconductor drum forms an electrostatic latent image, and the developer roller transfers toner to the portion of the drum surface to form the toner image. The laser printer may also include a toner-removal wiper that removes excess toner from the surface of the developer roller after the developer roller has contacted the photoconductor drum. The toner on the drum subsequently is transferred to paper, and then fuses to form the print.

Many different designs of laser printers are known. They include Shiraki et al., U.S. Pat. No. 5,768,668; Sato, U.S. Pat. No. 5,752,146; Park, U.S. Pat. No. 5,727,022; Okada et al., U.S. Pat. Nos. 5,669,047 and 5,655,197; Sakaguchi, U.S. Pat. No. 5,602,631; Iguchi et al., U.S. Pat. No. 5,600,417; Ikeda et al., U.S. Pat. No. 5,367,367; Kogo et al., U.S. Pat. Nos. 5,324,885 and 5,214,239; Kinoshita et al., U.S. Pat. Nos. 5,311,264 and 5,287,150; Nishio, U.S. Pat. Nos. 5,241,343, 5,076,201, and 5,062,385; and Goyert et al., U.S. Pat. No. 4,521,582; all of which are incorporated herein by reference.

The developer roller is cylindrical and typically includes a central shaft surrounded by a synthetic rubber or urethane elastomer portion. Often, high resolution laser printers include a developer roller having a resistivity of 1–3E9 ohm-cm and a hardness of 53–60 Shore A on roller. High speed (>15 pph), high resolution (1200 dpi) laser printers often use relatively small (1–8 um) toner particles in which the toner has a relatively low melting point. In these printers the developer roller sometimes melts a portion of the toner prior to transfer to the photosensitive drum. This can make the toner sticky, and lead to a ghosting problem in print quality. In addition, sometimes the developer roller does not pick up sufficient toner, resulting in a light print.

SUMMARY OF THE INVENTION

In general, the invention features a roller (e.g., a developer roller or charge roller) for use in laser printers. The roller generally includes an inner shaft surrounded by an outer, solid thermoset urethane portion. By solid, it is meant that the thermoset urethane portion is not a foam.

The thermoset urethane has a hardness of 30–50 Shore A, preferably 35–45 Shore A, on cube (flat surface), or 40–50 Shore A on roller (curved surface). On cube means that a cube of the urethane is tested for hardness. On roller means the roller itself is tested for hardness. Generally, the hardness of the thermoset urethane is 3–5 A higher on roller than on cube, due to taking the measurement on the curve surface of the roller. Developer rollers made using thermoset urethane having this hardness are less apt to cause melting of toner.

As a result, they provide good print quality, with limited if any ghosting. In addition, the developer roller has good conformability with the toner blade and as a result receives a more uniform thickness of toner.

The thermoset urethane also has a volume resistivity of 1E6 ohm-cm to 9E8 ohm-cm, and preferably 3E6 ohm-cm to 8E8 ohm-cm. The resistivity, and conductivity, of the roller is uniform, which enhances the print quality. The roller has uniform resistivity and conductivity in part because the thermoset urethane does not include any plasticizers or other liquids that migrate to the surface of the roller. The roller also has uniform resistivity and conductivity in part because the metallic salt in the urethane used to provide the conductivity is completely dissolved (i.e., is a solid solution) and complexed in the thermoset urethane. Finally, the thermoset urethane has excellent reversion or hydrolysis resistance and preferably exhibits a stable (i.e., changes no more than $3\times10^1$) volume resistivity even under a change of humidity of 10% to 90% and a change of temperature of 10° C. to 40° C.

The invention also features methods of preparing the roller including the thermoset urethane, as well as laser printers including the roller.

Other features and advantages will be apparent from the description of the preferred embodiments thereof, and from the claims.

BRIEF DESCRIPTION OF THE DRAWING

The FIGURE is a sectional view of a developer roller.

DESCRIPTION OF THE PREFERRED EMBODIMENTS

Referring to the FIGURE, a developer roller 10 includes a shaft 12 surrounded by a solid conductive thermoset urethane portion 14. The outer surface 16 of the roller may be uncoated, or may be coated with, for example, a rubber such as a urethane rubber, nitrile rubber or silicone rubber. The thickness of the coating may be, for example, between 1.5 and 10 mil.

Shaft 12 can be made of steel, aluminum, a conductive plastic, pultrusion conductive rod, or any other material commonly used for the shaft of the developer roller.

The preferred thermoset urethane portion is prepared from an isocyanate and a polyol and/or polyamine. The urethane also includes a metal salt, and may include a catalyst, a light stabilizer, and antioxidant. The thermoset urethane does not include a plasticizer or other liquid that can migrate to the surface of roller after cure.

The preferred isocyanate is a one-shot material, methylene diisocyanate (MDI), that has an NCO higher than 20. Specific examples of such MDI's include Isonate 2134 L, Isonate 180, Isonate 181, Isonate 191, Isonate 226, Isonate 240, and Isonate 125 M, all available from Dow Chemical, Miland, Mich.; Mondur PF, Mondur M, Mondur XP-744, Mondur CD, and Mondur E-501, all available from Bayer, Pittsburgh, Pa.; Lupranate M10, Lupranate M20 S, Lupranate M70 L, Lupranate M200, Lupranate No. 78 Iso, Lupranate M, Lupranate MS, Lupranate MP-102, Lupranate 103, and Lupranate 218 Iso, all available from BASF, Parsippany, N.J.

At least two polyols and/or polyamines are used in producing the urethane. One polyol and/or polyamine has a molecular equivalent weight less than 110. The other polyol and/or polyamine has a molecular equivalent weight of greater than 1500, and typically have a hydroxy number or amine number of less than 40. Using a polyol or polyamine with a molecular equivalent weight greater than 1500, and preferably greater than 2000, imports softness to the urethane. For purposes of this application, the polyols and/or polyamines with a molecular equivalent weight of greater than 1500 will be referred to as the "soft segment" polyol and/or polyamine, while the polyol and/or polyamine with the lower molecular equivalent weight of less than 110 will be referred to as the "hard segment" polyol and/or polyamine.

A sufficient amount of the soft segment polyol and/or polyamine should be used in forming the urethane to provide a thermoset urethane with a hardness of 30–50 Shore A on cube, and 35–50 Shore A on roller. Generally, the ratio of soft segment polyol/polyamine to hard segment polyol/polyamine should be between 4:1 and 1:1.

Examples of hard segment polyols and/or polyamines include butanediol (XB), available from GAF Chemicals, Wayne N.J.; tremethanol propane (TMP), available from Hoechst Celanese, Dallas, Tex.; trisopropylamine (TIPA), available from Dow Chemical, Midland, Mich.; Isonol 93, available from Upjohn Co., Kalamazo, Mich.; HQEE, available from Eastman Chemical Co., Kingsport, Tenn.; and hexanediol, available from Aldrich Chemical, Milwaukee, Wis.

Examples of soft segment polyols and/or polyamines include Pluracol Polyol 994 LV, Pluracol Polyol 816, Pluracol Polyol 945, Pluracol Polyol 1117, Pluracol Polyol 380, Pluracol Polyol 538, Pluracol Polyol 220, Pluracol Polyol 628, and Pluracol Polyol TPE 4542, available from BASF, Parsippany, N.J.; Acclaim Polyol 4220 and Acclaim Polyol 3000, available from Arco Chemicals, New Square Pa.; and Polamine 3000 and Polamine 4000, available from Air Products, Allentown, Pa.

Examples of catalysts that can be used in forming the urethane include Fomrez UL-32 and Fomrez 29, available from Witco, Taft, La.; and Dabco T-12, Dabco T-9, and Dabco 331 v, available from Air Products, Allentown, Pa. The urethanes may include, for example, between 0.005% and 0.1% of the catalyst by weight.

The metal salt provides the thermoset urethane with the appropriate conductivity. The metal salt is fully dissolved and evenly complexed with the thermoset urethane, resulting in a uniform, three-dimensional charge distribution. Examples of metal salts that can be used include transition metal halide salts such as iron chloride copper chloride, iron bromide, and copper bromide; and lithium salts such as lithium chloride and lithium perchlorate. All of these are available from Aldrich Chemical, Milwaukee, Wis. The thermoset urethane typically will include between 0.05% and 2% and preferably between 0.1% and 1%, of the metal salt by weight.

Examples of UV light stabilizers that can be used include Tinuvin P, Tinuvin C 353 FF, Tinuvin 111 FB, Tinuvin 111 FDL, Tinuvin 123, Tinuvin 144, Tinuvin 213, Tinuvin 234, Tinuvin 326, Tinuvin 327, Tinuvin 328, Tinuvin 622 LD, Tinuvin 765, Tinuvin 770 DF, Tinuvin 783 FB, Tinuvin 783 FD, Tinuvin 783 FDL, Uvitex OB, and Chimassorb 81, Chimassorb 119 FL, Chimassorb 944 LD/FL, all available from BHT from Ciba, Tarrytown, N.Y.

The thermoset urethane generally include between 0.1% and 5%, and preferably between 1% and 3%, of the stabilizer by weight.

Examples of antioxidants include Irganox 245, Irganox 1010, Irganox 1076, Irganox 1098, Irganox 1135, and Irganox 5057, all available from Ciba. The thermoset urethane generally includes between 0.1% and 5%, and preferably 0.5% and 3%, of the antioxidant by weight.

Both the UV light stabilizer and the antioxidant inhibit the addition reaction and oxidation reaction of the roller surface.

The roller can be prepared by combining the appropriate urethane precursors and other ingredients in a tube or shaft mold that includes a pre-baked shaft with an adhesive coating. The shaft can be, for example, be rod-shaped or a circular tube, while the mold can be U-shaped, rectangular, square, or circular. The molding procedure can be, for example, vertical or horizontal casting, spin casting, a centrifugal method, or an extrusion or protrusion process. The mixture is cured for 15–30 minutes at 170° F., and the resulting roller is demolded and post-cured for 12–16 hours at 180° F. in the oven. The desired top coating (if any) is applied to the roller by an extrusion or spray-coating process, and then may undergo finish grinding to provide a final roller with specified dimensioning, resistivity, and surface roughness for use in a laser printer.

In a preferred procedure, the metal salt is at least partially dissolved in polyol and/or polyamine before being combined with the additional polyol and/or polyamine and isocyanate. This typically is accomplished, for example, by heating a mixture including the salt and polyol/polyamine at an elevated temperature (e.g., 80° F.–130° F.) for one or two hours under vacuum. For purposes of this application, the resultant solution will be referred to as the "conductive curative." Typically the concentration of the metal salt in the conductive curative will be between 1% and 5% by weight. The conductive curative also may include, for example, the UV light stabilizer and/or antioxidant.

The conductive curative reacted with isocyanate in the mold, with the other components of the thermoset urethane precursors, using standard equipment.

EXAMPLE 1

An example of a developer roller including a thermoset urethane portion was made according to the following procedure, using a Max machine, an automated metering machine.

The Max machine was set up to meter three streams of materials including isocyanate, polyol, and conductive polyol into the mold, according to the following process parameters (total flow rate 700 g/min):

| Stream | Temp. | Material | Flow rate (g/min.) |
|---|---|---|---|
| B1 | 100° F. | Isocyanate 2134L (I-2143) | 81.34 |
| B2 | 130° F. | Pluracol Polyol 380 (P380) | 234.66 |
| A | 80° F. | Conductive curative | 383.99 |

The B1 stream is continuously feeding from a 55 gallon drum under high vacuum.

The B2 stream is continuously feeding from a drum including P-380, equipped with a mixer; the P-380 is maintained in the drum at 180° F. and had been under high vacuum (<28 vacuum) for 2 hours prior to use. The amounts of P-380 used was determined by titrating the NCO of the I-2143 and then calculating the equivalent weight of P-380 and the polyol in the conductive curative. For example, if the NCO of the I-2143 is found to be 29, the equivalent weight of P-380 may be 2226.468 and the equivalent weight of the polyol in the conductive curative is 820.5.

The conductive curative including iron chloride used in stream A was prepared according to the following procedure.

A mixture of iron chloride (2188.42 g) and butanediol (XB) (4575.79 g) was prepared by premixing the two at room temperature for 5 minutes. An exothermic reaction occurs and the temperature rises to about 190° F. The mixture then was cooled down to 100° F. with stirring. The mixture was vacuum degassed for 45 minutes and the temperature cooled to 80° F.

P-380 (136079.9 g) was poured into a standby tank, with the temperature maintained at 180° F. for at least two hours under high vacuum and stirring before other components are added. The P-380 drum had been heated at 180° F. in a heating hood for one night prior to use.

After two hours of vacuum at 180° F. of the P-380 in the tank, a UW light stabilizer (T-328, 5013.5 g) and an antioxidant (BHT, 2910.879) were slowly added over 10 minutes with stirring. Trimethanol propane (TMP) (596.8 g) was then added over one minute with stirring. The mixture of iron chloride and XB was then added over two minutes.

Under continuous stirring and vacuum, the conductive curative in the standby tank was cooled down to 80° F. The conductive curative in the standby tank can then be charged (as stream A) into the Max machine.

The Max machine provides the three streams to pour materials into a roller mold maintained at 170° F. The mold includes a shaft having an OD of 10 mm and a length of 27.5 mm that has been prebaked at 220° F. for at least an hour. The mold has an OD of 21.8 mm and a length of 241 mm. The shaft is coated with an adhesive (e.g., MPC Conadh 1000, available from Mearthane Products of Cranston, R.I.) using a brush while the shaft is rotating. This coating is dried under venting oven for at least three hours. The roller is removed from the mold after 10–15 minutes curing, and was then postcured at 180° F. for 12–16 hours.

A cube for hardness testing also is prepared by pouring the materials into a separate cube mold, 1.3"×1.3"×0.5", which stays at the same temperature as the mold temperature.

The properties of the thermoset urethane portion of the roller are tested two days after the postcure. The thermoset urethane had a hardness (on cube) of 38±3 A and a hardness (on roller) of 42±3 A. The sample cubes were placed in a humidity chamber for one day before measurements. The volume resistivity at 72° F., 50% relative humidity of the thermoset urethane portion was 6–8 E6 ohm-cm after two days, and 5.5 E6 ohm-cm after 7 days.

The roller was finish grinded to a size of 18.7 mm OD and 230 mm length (for the urethane portion). The final roller had a surface roughness of less than 0.6 um, preferably about 0.4 um.

The roller was used as a developer roller in a laser printer (Samsung High Speed Model B) and performed well.

A charge roller having the same composition was prepared using a similar process and had an OD of 11.84 mm, a length of 230 mm (for the urethane portion), and a length of 258 mm (for the shaft). The charge character and print quality was good when the charge roller was used in a Fuji-Xerox laser printer (P/N:59K903).

The developer and charge rollers can be further coated with nitrile rubber or silicone rubber having a thickness of 1–10 mil for different speed and model laser printers.

EXAMPLES 2–6

Five further conductive thermoset urethanes for developer rollers were prepared using the same general procedure used in Example 1. The materials used to prepare the rollers also generally were the same, except for the conductive curative. The composition of the conductive curative (including the quantity of each in grams), the hardness (on cube) for the thermoset urethane, and the volume resistivity after 7 days are provided below for each example in Tables I and II.

TABLE I

| Conductive Curative | | | | | | | |
|---|---|---|---|---|---|---|---|
| Ex. | P-380 | XB | TMP | Salt | Salt Quantity | T-328 | BHT |
| 2 | 134762 | 4696 | 613 | $LiClO_4$ | 327 | 5145 | 2911 |
| 3 | 134123 | 4674 | 610 | $CuCl_2$ | 1016 | 5121 | 2911 |
| 4 | 136424 | 4754 | 620 | $CuCl_2$ | 1447 | 5208 | — |
| 5 | 135669 | 4278 | 617 | $FeCl_3$ | 2261 | 5180 | — |
| 6 | 134736 | 4695 | 612 | $FeCl_3$ | 3266 | 5144 | — |

TABLE II

| Results | | |
|---|---|---|
| Ex. | Hardness | Volume Resistivity (ohm-cm) |
| 2 | 43A | 5E7 |
| 3 | 43A | 1E7 |
| 4 | 42A | 8E6 |
| 5 | 42A | 5.5E6 |
| 6 | 41A | 3.5E6 |

EXAMPLE 7

A conductive thermoset urethane for a developer roller was prepared from a conductive curative (800 g), isonate 2143 (106 g), and UL-29 (40 drops). The conductive curative was preheated to 130° F., and the isonate 2143 was preheated to 110° F. The conductive curative included (in relative amounts) P-380 (455 g), XB (13 g), $FeCl_3$ (5.5 g), and Tinuvin 328 (16 g). The components of the conductive curative were combined and heated at 150° F.–170° F., and then cooled to 130° F. and vacuum filtered.

The hardness (on cube) of the thermoset urethane was 35 A and the volume resistivity was 4.5 E6 ohm-cm.

A developer roller was prepared including the thermoset urethane, and was provided with a 4 mil coating of nitrile rubber. The developer roller provided good print quality when used in a laser printer.

EXAMPLE 8

A conductive thermoset urethane for a charge roller was prepared from Mondur PF (75 g), a conductive curative (461.5 g), and UL-29 (40 drops). The conductive curative included (in relative amounts) P-380 (665.0 g), XB (8.63 g), $FeCl_3$ (5.23 g), Tinuvin 328 (16 g), and BHT (8 g).

The hardness (on cube) of the resultant thermoset was 30 A (on cube), and the volume resistivity was 4.5E6 after seven days.

A charge roller was prepared including the thermoset urethane, and was provided with a 2 mil coating of nitrile rubber.

EXAMPLE 9

A conductive thermoset urethane was prepared by reacting Mondure PF (75 g) and a conductive curative (451.6 g). Both were preheated to 100° F. The conductive curative included (in relative amounts) P380 (886 g), XB (17.2 g), $LiClO_4$ (7 g), and Tinuvin 328 (16 g). The components are combined and mixed at 150° F.–170° F.

The hardness (on cube) of the thermoset urethane was 35 A and the volume resistivity was 8.5 E6 ohm-cm after seven days.

A charge roller was prepared including a thermoset urethane and was provided with a 2 mil coating of nitrile rubber.

EXAMPLE 10

A conductive thermoset urethane was prepared by reacting isonate 2143 L (106 g), a conductive curative (800 g), and UL-32 (20 drops). The conductive curative included P380 (455 g), XB (13 g), $CuCl_2$ (5.5 g), Tinuvin 328 (16 g), and BHT (8 g).

The hardness (on cube) of the thermoset urethane was 35 A and the volume resistivity was 4.5 E6 ohm-cm after seven days, measured at 72° F. and 50% RH.

A developer roller was prepared in the thermoset urethane. The roller was not provided with a top coat.

EXAMPLE 11

A conductive thermoset urethane was prepared by reacting isonate 2143 L (106 g), a conductive curative (688 g), and UL-32 (15 drops). The conductive curative included (in relative amounts) P380 (455 g), XB (13.5 g), $CuCl_2$ (4.5 g), and Tinuvin 328 (18 g).

The hardness (on cube) of the thermoset urethane was 41 A and the volume resistivity was 8.5 E6 ohm-cm after seven days, measured at 72° and 50% RH.

A charge roller was prepared including the thermoset urethane. The roller was not provided with a top coating.

EXAMPLE 12

A conductive thermoset urethane was prepared by reacting isonate 2143 L (106 g), a conductive curative (709 g), and UL-32 (15 drops). The conductive curative included (in relative amounts) P380 (470 g), XB (13.2 g), $FeCl_3$ (4.5 g), Tinuvin 328 (18 g), and BHT (9 g).

The hardness (on cube) of the thermoset urethane was 38 A and the volume resistivity was 8.5 E6 ohm-cm after seven days.

A developer roller was prepared including the thermoset urethane. The roller was not provided with a top coating.

EXAMPLES 13–17

Developer rollers were prepared from the conductive thermoset urethanes made from the components (in grams) listed in Table III. All of the rollers were coated by oxidation surface to form the resistance layer (50–150 um thickness).

TABLE III

| | Ex. 13 | Ex. 14 | Ex. 15 | Ex. 16 | Ex. 17 |
|---|---|---|---|---|---|
| 12143L | 212 | 212 | 212 | 212 | 212 |
| Conductive Curative | 1571 | 1571 | 1571 | 1618 | 1618 |
| Tinuvin 328 | 36 | 36 | 36.6 | 36.6 | 36.6 |
| BHT | 18 | 18 | 18 | 18 | 18 |
| UL-32 | 1 drop | 1 drop | 1 drop | 5 drops | 5 drops |
| Conductive Curative | | | | | |
| P380 | 570 | 570 | 570 | 570 | 570 |
| TMP | 1.5 | 1.5 | 1.5 | 1.5 | 1.5 |
| XB | 11.5 | 11.5 | 11.5 | 11.5 | 11.5 |
| $FeCl_3$ | 0.5 | 0.4 | 0.3 | — | — |
| $LiClO_4$ | — | — | — | 0.7 | 1.0 |
| Hardness (on cube) | 38A | 38A | 38A | 39A | 32A |
| Volume Resistivity (after 7 days) | 4.3E7 | 5.5E7 | 8.5E7 | 9.0E7 | 8.4E7 |
| Coat Thickness (um) | 60 | 80 | 120 | 50 | 60 |

EXAMPLES 18–27

Conductive thermoset urethanes for developer rollers were made from the components (in grams) listed in Table IV:

TABLE IV

| | Charge Rollers | | | | | | | | | |
|---|---|---|---|---|---|---|---|---|---|---|
| | Ex. 18 | Ex. 19 | Ex. 20 | Ex. 21 | Ex. 22 | Ex. 23 | Ex. 24 | Ex. 25 | Ex. 26 | Ex. 27 |
| 12143L* | 212 | 212 | 212 | 212 | 212 | 212 | 76 | 76 | 212 | 212 |
| Conductive Curative | 2022 | 2027 | 2024 | 1441 | 1444 | 1449 | 452 | 452 | 2320 | 1754 |
| T-328 | 43 | 43 | 43 | 33 | 33 | 33 | — | 15.8 | 54 | 40 |
| UL-32 (drops) | | | | | | | 4 | 4 | 20 | 20 |
| Conductive Curative | | | | | | | | | | |
| P380 | 1000 | 1000 | 1000 | 480 | 480 | 480 | 886 | 886 | 1500 | 700 |
| TMP | 1.5 | 1.5 | 1.5 | 1.5 | 1.5 | 1.5 | — | — | 1.5 | 1.5 |
| XB | 11.5 | 11.5 | 11.5 | 11.5 | 11.5 | 11.5 | 17.2 | 17.2 | 11.5 | 11.5 |
| $FeCl_3$ | 2.8 | 5.5 | 3.7 | 2.8 | 3.7 | 5.5 | 7.0 | 7.0 | 6 | — |
| $LiClO_4$ | — | — | — | — | — | — | — | — | — | 8 |

*Mondure PF, not 12143L, was used in Examples 24 and 25.

Charge rollers prepared with the conductive thermoset urethane in Table IV had the properties tabulated in Table V:

TABLE V

| Ex. | Hardness | Volume (ohm-cm) Resistivity |
|---|---|---|
| 18 | 34A | 1.1E7 |
| 19 | 34A | 9.0E6 |
| 20 | 34A | 6.0E6 |
| 21 | 42A | 1.2E7 |
| 22 | 42A | 9.0E7 |
| 23 | 42A | 6.0E6 |
| 24 | 34A | 9.0E6 |
| 25 | 34A | 9.0E6 |
| 26 | 30A | 8.0E6 |
| 27 | 34A | 1.0E7 |

Other embodiments are within the claims.

What is claimed is:

1. A method of preparing a roller including a conductive thermoset urethane prepared from urethane precursors including an isocyanate and a polyol and/or a polyamine, comprising fully dissolving a metal salt in the urethane precursor, and curing the urethane precursors in a roller mold to provide a roller including a solid, thermoset urethane having a hardness of between 30 Shore A and 50 Shore A on cube and a volume resistivity of 1E6 ohm-cm and 9E8 ohm-cm, the metal salt being fully dissolved in the thermoset urethane.

2. A method of preparing a roller including a conductive, thermoset urethane prepared from urethane precursors including an isocyanate, a first polyol and/or polyamine having an equivalent molecular weight of greater than 1500, and a second polyol and/or polyamine having an equivalent molecular weight of less than 110, the method comprising supplying three streams of liquid to a roller mold, the first stream including the isocyanate, the second stream including the first polyol and/or polyamine, and the third stream including the second polyol and/or polyamine, wherein a metal salt is included in the third stream, and curing the urethane precursors in the roller mold to provide a roller including a thermoset urethane having a hardness of between 30 Shore A and 50 Shore A on cube and a volume resistivity of 1E6 ohm-cm and 9E8 ohm-cm.

3. The method of claim 2, wherein the first polyol and/or polyamine has an equivalent molecular weight of greater than 2000.

4. The method of claim 2, wherein no plasticizer is included in the thermoset urethane.

5. The method of claim 2, wherein the isocyanate include methylene diisocyanate.

6. The method of claim 5, wherein the methylene diisocyanate has an NCO of greater than 20.

* * * * *

UNITED STATES PATENT AND TRADEMARK OFFICE
CERTIFICATE OF CORRECTION

PATENT NO. : 6,780,364 B2
DATED : August 24, 2004
INVENTOR(S) : Albert C. Chiang, Ph.D. and John A. Roderick It is certified that error appears in the above-identified patent and that said Letters Patent is hereby corrected as shown below:

Title page,
Item [56], References Cited, U.S. PATENT DOCUMENTS, replace "3,993,084A 11/1976 Cullen et al." with -- 3,993,024 11/1976 Stansell --.

Signed and Sealed this

Fifth Day of July, 2005

JON W. DUDAS
*Director of the United States Patent and Trademark Office*